United States Patent [19]
Kenney et al.

[11] Patent Number: 6,055,264
[45] Date of Patent: Apr. 25, 2000

[54] METHOD AND APPARATUS FOR FAST ACQUISITION AND MULTIPATH SEARCH IN A SPREAD SPECTRUM SYSTEM

[75] Inventors: Thomas Kenney; Afsar Chowdhury, both of San Diego, Calif.

[73] Assignee: Nokia Mobile Phones Limited, Espoo, Finland

[21] Appl. No.: 08/904,897

[22] Filed: Aug. 1, 1997

[51] Int. Cl.[7] .................................................. H04B 15/00
[52] U.S. Cl. .......................... 375/150; 375/142; 708/813; 708/422
[58] Field of Search .................................... 375/206, 208, 375/209, 210, 142, 145, 149, 150; 708/422, 813

[56] References Cited

U.S. PATENT DOCUMENTS

| | | | |
|---|---|---|---|
| 5,440,597 | 8/1995 | Chung et al. ............................. | 375/200 |
| 5,491,718 | 2/1996 | Gould et al. ............................. | 275/205 |
| 5,596,571 | 1/1997 | Gould et al. ............................. | 370/335 |
| 5,642,377 | 6/1997 | Chung et al. ............................. | 375/200 |
| 5,654,980 | 8/1997 | Latva-aho et al. ...................... | 375/208 |

Primary Examiner—Stephen Chin
Assistant Examiner—Kevin M Burd
Attorney, Agent, or Firm—Brian T. Rivers

[57] ABSTRACT

Early and on-time signals are generated from a received CDMA signal for each PN code phase being searched, and the early and on-time signals are each divided into a number of subdwells sequentially in time. A correlation is then performed for each PN code phase search, on subdwells of the early and on-time signals for that PN code phase in a staggered manner in time, by alternating the correlation between the early and on-time signals during each sequential subdwell correlation. A detection statistic for the PN code phase is then generated from the correlation result. In an embodiment of the invention, two PN code phases are searched simultaneously by staggering the subdwell correlations in an alternate fashion between the early and on-time signals, so that each PN code phase uses a different set of subdwell correlations. In an alternative embodiment, a single PN code phase is searched by alternating the correlation between the early and on-time signals during each sequential subdwell correlation.

24 Claims, 3 Drawing Sheets

METHOD AND APPARATUS FOR FAST ACQUISITION AND MULTIPATH SEARCH IN A SPREAD SPECTRUM SYSTEM

FIELD OF THE INVENTION

This invention relates to direct sequence spread spectrum (DS-SS) telecommunications systems. More specifically, this invention relates to a method and apparatus for fast acquisition and fast multipath searching of signals in a direct sequence spread spectrum telecommunications system.

BACKGROUND OF THE INVENTION

In the field of telecommunications, efforts have recently been directed towards developing advanced direct sequence spread spectrum (DS-SS) telecommunications systems. One example of a DS-SS type system is a Code Division Multiple Access (CDMA) type system.

In a CDMA type system multiple users, each using a channel identified by a uniquely assigned digital pseudonoise (PN) code sequence, simultaneously communicate with the system while sharing the same wideband frequency spectrum. Channel identification through the uniquely assigned digital codes is achieved by using the unique PN code to spread a digital information signal that is to be transmitted. The digital information signal may be a signal, such as the output of a digitized voice circuit that may have a bit rate, for example, of 10 kb/s, or a data signal that may have a higher bit rate. The PN code signal usually has a bit rate of several orders of magnitude greater than the information signal.

During spreading, the digital signal bandwidth is spread through the frequency bandwidth of the PN code sequence. Spreading is achieved by multiplying the PN code sequence and information signal in the time domain to generate a spread signal that has a bit rate of the PN code sequence. The spread signal is then RF modulated and transmitted on a carrier frequency that may also carry transmissions of information signals of other system users, where the other information signals have been spread by PN code sequences unique to each of the other users. The PN code sequences may be uniquely identified by having a unique phase or a unique bit sequence. In certain systems, such as a system operating according to the Telecommunications Industry Association/Electronic Industry Association (TIA/EIA) IS-95 standard, a transmission may be identified by two PN sequences. In IS-95 an individual base station is assigned a unique phase for a common system PN code sequence that spreads all forward link transmissions from base stations of that system. The unique phase identifies the base station. Each transmission from a base station is then also spread by a unique Walsh PN code sequence that identifies the particular channel on which the transmission is sent.

At the receiver, after carrier frequency demodulation, despreading is accomplished by generating a local replica of the transmitting user's assigned PN code with a random-sequence generator in the receiver, and then synchronizing the local PN code sequence to the PN code sequence that was superimposed by the transmitter on the incoming received signal. By removing the random sequence from the received signal and integrating it over a symbol period, a despread signal is obtained which ideally exactly represents the original digital information signal.

The process of signal synchronization is usually accomplished in two steps. The first step, called acquisition, includes bringing the PN code sequences generated in the transmitter and receiver into coarse time alignment, usually within one code chip interval. The second step, called tracking, involves continuously maintaining the best possible waveform alignment by means of a feedback loop.

Because of the importance of synchronization (or acquisition), many schemes have been proposed utilizing various types of detectors and decision strategies in different application areas. A common feature of all synchronization schemes is that the received signal and the locally generated PN code sequence are first correlated to determine the measure of similarity between the two. Secondly, the measure of similarity is compared to a threshold to decide if the two signals are in synchronization. If there is no synchronization, the acquisition procedure provides a change in the phase of the locally generated PN code sequence and another correlation is attempted as a part of the signal search through the receiver's PN phase space.

The speed of signal code acquisition and synchronization is generally an important performance factor in CDMA systems. For example, in an IS-95 system a mobile station must quickly search, acquire and synchronize to many different signals while maintaining communications with the system. The mobile station must initially acquire a pilot channel of the system upon powerup or entry into the system. As the mobile station moves through the system it must continually search, during ongoing communications, for stronger pilot channels of base stations located near the base station with which the mobile station is communicating. The pilot channels in IS-95 are transmitted by each base station using the same PN code but with different offsets, which allows them to be distinguished. All pilot channels in the IS-95 system use the Walsh code sequence of all ones, allowing the pilot channels to be received by all mobiles in the system. The mobile station searches for pilot channels based on PN pilot channel phase information received from the system. The mobile station must also search for phase varying multipath signals originally transmitted on a communications channel from a particular base station. Several multipath signals carrying the same information and on channels identified by the same PN code, but displaced in phase because of RF propagation effects, have to be searched so that the strongest signals can be found, combined and decoded. During handoff between base stations utilizing the same carrier frequencies (soft handoff), the mobile station must also search for and acquire voice channels of target base stations while simultaneously maintaining communications on a voice channel with the current base station.

As an example, pilot channel acquisition may be performed by generating an "early" and "on-time" signal from the received signal, for each pilot channel PN phase offset in the search set. The early and on-time signals may be spaced ½ of a chip period apart. Correlation is then performed on each of the early and on-time signals to generate a detection statistic. Correlation usually involves multiplying the early and on-time signals by a PN code sequence generated in the receiver and performing time integration on each multiplication result. Generally, both the early and on-time signals are correlated independently, and from this, two decisions statistics are formed. Typically, the larger of the two statistics is chosen and survives as the detection statistic for that particular offset tested. Detection statistics are generated for the PN phases searched and decisions are made based on the statistics. For example, synchronization to a pilot channel may be determined at the phase having the detection statistic with greatest magnitude. In multipath searching, a number of PN phase offsets having the detection statistics with greatest magnitude may be chosen for multipath reception.

An expression for the output of the on-time (o) correlation result may be given as:

$$r_o^1(n) = \sum_{m=0}^{(M-1)} w(m)b(m)b(m-q)p(m-qT_c - \tau) \quad (1)$$

$$n = 0, 1, \ldots, N-1$$

and the early correlation (e) result as:

$$r_e^{(1)}(n) = \sum_{(m=0)}^{(M-1)} w(m)b(m)b(m-q)p\left(m - qT_c - \frac{T_c}{2} - \tau\right) \quad (2)$$

$$n = 0, 1, \ldots, N-1$$

where $b(m)=\pm 1$ is the spreading code of the transmitted signal as received; $b(m-q)=\pm 1$ is the receiver generated spreading code having q as an offset relative to $b(m)$; $w(m)=\pm 1$ is the Walsh sequence; $p(m-qT_c-\tau)$ is the convolution of the transmitter and receiver filters, where $\tau$ is the time misalignment in the receiver pulse shaping filter, $T_c$ is the chip period, and the value $qT_c$ continues the integration time into the next chip in the PN code; M is the length of the integration, (1) is the PN code phase under test, and N is the total number of subdwells. For the example of IS-95 pilot channel acquisition, the Walsh sequence $w(m)$ may be set to all ones to describe acquisition of the pilot channel.

As an alternative to summing the integration results from equation 1 to generate the detection statistic, the detection statistic may be generated by performing an FFT on each of the early and on-time integration results where the total integration is segmented into N equal length subdwells. Those subdwells are used as an input to an FFT routine which can be written as:

$$R_o^{(1)}(k) = \sum_{(n=0)}^{(N-1)} r_o^{(1)}(n)e^{\frac{-j2\pi kn}{N}} \quad (3)$$

$$R\frac{(1)}{e}(k) = \sum_{(n=0)}^{(N-1)} r_e^{(1)}(n)e^{\frac{-j2\pi kn}{N}} \quad (4)$$

where $r_e^{(1)}(n)$ represents the integration output for the nth subdwell for the early signal and $r_o^{(1)}(n)$ represents the output for the nth subdwell for the on-time signal. The larger result may be chosen as the detection statistic in this case.

FIG. 1 illustrates the correlation process graphically. In FIG. 1, eight subdwell values are shown for the early 102 and on-time 104 signal. For each of the on-time eight subdwell values, $r_o^{(1)}(n)$, n=0, ... 7 is generated as in equation 1, and for each of the eight early subdwell values, $r_e^{(1)}(n)$, n=0, ... 7 is generated as in equation 2. Subsequent to the integration, two independent FFTs, $R_e(k^2)$ and $R_o^{(1)}$ (k), are computed for PN code phase 1 as in equations 3 and 4.

Equations 1–4 include complex values. One skilled in the art will realize that the process shown in FIG. 1 also includes processing of complex components of the signal.

The early/on-time method provides a good detection probability. However, in the early/on-time correlation method, only one PN code phase may be tested at a time for each pair of correlations (early and on-time) performed on the early/on-time signal pair. The method also requires hardware capable of performing the two integrations for the same PN code phase simultaneously.

In certain applications it may be desirable to use early/on-time acquisition and multipath searching techniques that can be executed faster than the conventional techniques. In other applications it may be desirable to decrease the complexity of the hardware necessary for early/on-time acquisition and multipath searching while maintaining the same speed. In many applications it may be desirable to both increase the speed of the acquisition procedure and decrease the hardware complexity.

OBJECTS OF THE INVENTION

It is therefore an object of this invention to provide an improved method and apparatus for acquisition and multipath searching of direct sequence spread spectrum (DS-SS) signals using early/on-time correlation of a received signal.

It is another object of this invention to provide a method and apparatus for acquisition and multipath searching of direct sequence spread spectrum (DS-SS) signals wherein more than one pseudonoise (PN) code phase may be searched simultaneously using early/on-time correlation of a received signal.

It is a further object of this invention to provide a method and apparatus for acquisition and multipath searching of direct sequence spread spectrum (DS-SS) signals using early/on-time correlation techniques having reduced hardware complexity, relative to the prior art.

SUMMARY OF THE INVENTION

The present invention provides a method and apparatus for the fast acquisition and multipath searching of direct sequence spread spectrum (DS-SS) signals in a telecommunications system. The method and apparatus utilizes an improved early/on-time correlation technique. The improved early/on-time correlation may be used to allow more than one pseudonoise (PN) code phase to be searched simultaneously compared to using conventional early/on-time correlation.

Alternatively, the improved early/on-time correlation technique may be used to reduce the complexity of the hardware required for acquisition and multipath searching.

In the method and apparatus, early and on-time signals are generated from a received direct sequence spread spectrum (DS-SS) signal for each PN code phase being searched, and the early and on-time signals are each divided into a number of subdwells sequentially in time. A correlation is then performed for each PN code phase search, on subdwells of the early and on-time signals for that PN code phase in a staggered manner in time, alternating between the early and on-time subdwells.

In an embodiment of the invention, two PN code phases are searched simultaneously by staggering the subdwell correlations. The search for each PN code phase is performed by alternating subdwell correlations sequentially between the early and on-time signals. For the first PN code phase searched, the first subdwell of the early signal may be integrated for the first subdwell result, and the second subdwell of the on-time signal may be integrated for the second subdwell result. Simultaneously, the second PN code phase is searched by integrating the first subdwell of the on-time signal for the first subdwell result, and the second subdwell of the early signal for the second subdwell result. For each of the PN code phases, correlation continues to be performed on alternating subdwells of the early and on-time signals until the correlation of the last subdwell is completed and each PN code phase has N subdwell correlation results.

The N subdwell correlation results for each of the PN code phases are from a different set of subdwells. An FFT is then separately performed on the results of the N subdwell correlations for each PN code phase. The FFT result is then used as the detection statistic for the PN code phase.

In another embodiment of the invention, a single PN code phase is searched by staggering subdwell correlations. The search for the PN code phase is performed by alternating subdwell correlations sequentially between the early and on-time signals generated for that PN code phase. The first subdwell of the early signal may be integrated for the first subdwell result, and the second subdwell of the on-time signal may be integrated for the second subdwell result. Alternatively, the PN code phase may be searched by integrating the first subdwell of the on-time signal for the first subdwell result, and the second subdwell of the early signal for the second subdwell result. For either case, correlation continues to be performed on alternating subdwells of the early and on-time signals until the correlation of the last subdwell is completed and the PN code phase has N subdwell correlation results. An FFT is then performed on the results of the N subdwell correlations for the PN code phase. The FFT result is then used as the detection statistic for the PN code phase.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 2:
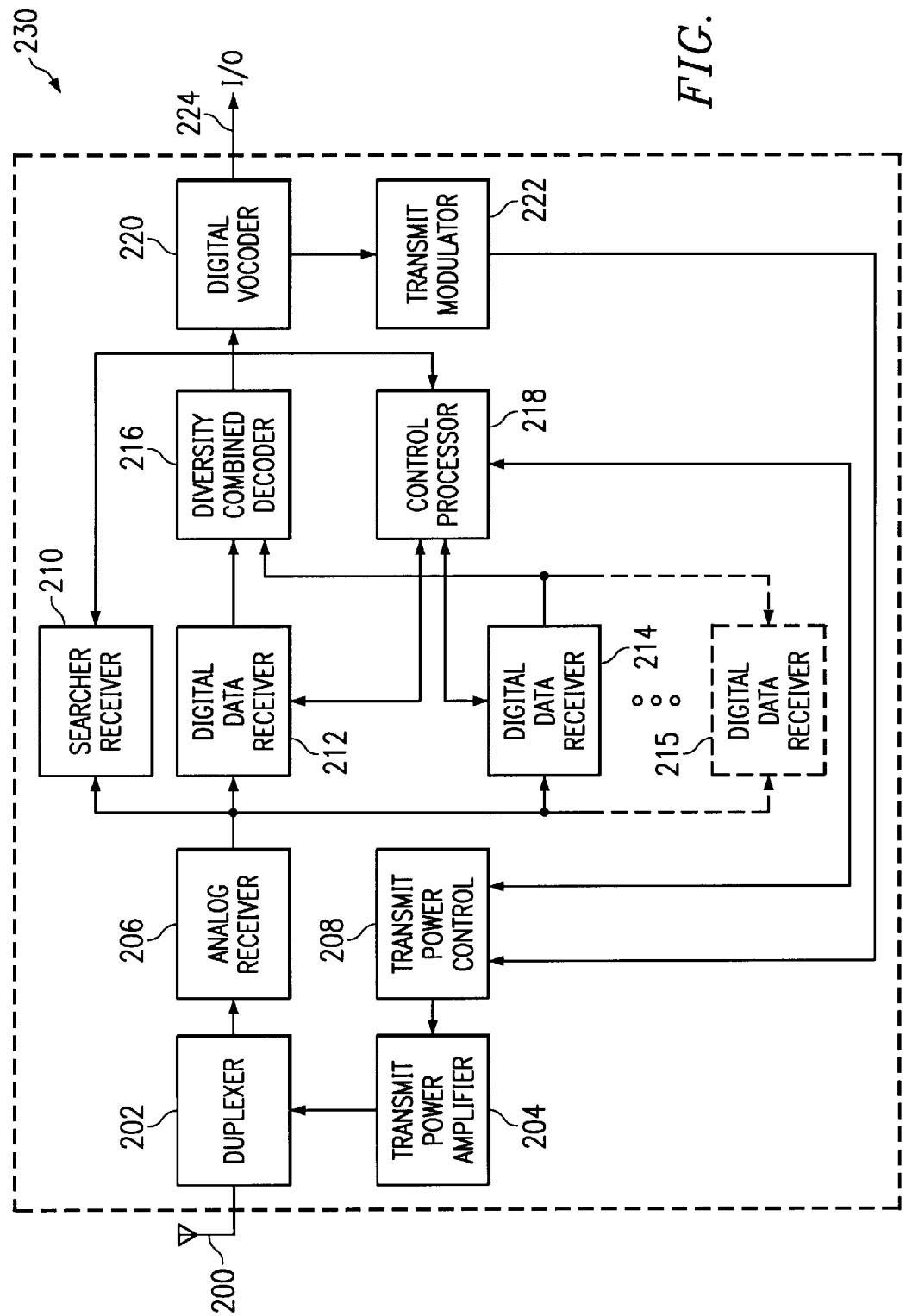
FIG. 2 is a block diagram of a CDMA receiver constructed according to an embodiment of the invention.

Referring now to FIG. 2, therein is a block diagram showing portions of a mobile station 230 constructed according to an embodiment of the invention. Mobile station 230 comprises an antenna 200, duplexer 202, transmit power amplifier 204, analog receiver 206, transmit power controller 208, staggered correlation searcher/receiver 210, a first digital data receiver 212, a second digital data receiver 214, diversity combiner/decoder 216, control processor 218, user digital vocoder 220, transmit modulator 222, and user interface 224. Additional digital data receivers, such as digital data receiver 215, shown by dotted line, may be added depending on the particular application. Mobile station 230 may operate according to the Telecommunications Industry Association/Electronic Industry Association (TIA/EIA) IS-95 standard, or in accordance with The American National Standards Institute (ANSI) 008 standard for code division multiple access (CDMA) cellular systems. Alternatively, mobile station 230 could operate according to other CDMA system standards. In general, the invention has applicability to all types of DS-SS systems in which PN sequences are used to spread signal channels.

Antenna 200 is coupled to analog receiver 206 through duplexer 202. Signals received at antenna 200 are input to analog receiver 206 through duplexer 202. The received signals are converted to an IF frequency and then filtered and digitized in analog receiver 206 for input to the digital data receiver 212, digital data receiver 214 and staggered correlation searcher/receiver 210. The digitized IF signal input to digital data receiver 212, digital data receiver 214 and searcher/receiver 210 may include signals from many ongoing calls, together with the pilot carriers transmitted by the base station of the cell site in which the mobile station is currently located, plus the pilot carriers transmitted by the base stations in all neighboring cell sites. Digital data receiver 212 and digital data receiver 214 perform a correlation on the IF signal with a PN sequence of a desired received signal. The output of digital data receivers 212 and 214 is a sequence of encoded data signals from two independent paths. If more than two digital data receivers are used, as indicated by digital data receiver 215, the output of each additional receiver adds a sequence of encoded data from an additional independent path.

Staggered correlation searcher/receiver 210 searches the pilot channel PN phase offset space for pilot channel signals transmitted from a base station. Searcher/receiver 210 is also used to search for other signals transmitted from different base stations, according to the invention. Staggered correlation searcher/receiver 210 generates correlation results for a desired waveform and generates signals to control processor 218 indicating the correlation results of the searched signals.

The encoded data signals output from digital data receiver 212 and digital data receiver 214 are input to diversity combiner/decoder 216. In diversity combiner/decoder 216 the encoded data signals are aligned and combined, the resultant data signal is then decoded using error correction, and is then input to digital vocoder 220. Digital vocoder 220 outputs information signals to the user interface 224. The user interface 224 may be a handset with a keypad or another type of user interface, such as a laptop computer monitor and keyboard.

For transmission of signals from mobile station 230, a signal received at user interface 224 is input to user digital vocoder 220 in digital form as, for example, data or voice that has been converted to digital form at user interface 224. In digital vocoder 220 the signal is encoded and output to transmit modulator 222. Transmit modulator 222 Walsh encodes the signal and then modulates the Walsh encoded signal onto a PN carrier signal, with the PN carrier sequence being the PN carrier sequence of the CDMA channel to which the mobile station is assigned. The PN carrier information is transmitted to mobile station 230 from the telecommunications system and transferred to control processor 218 from digital data receivers 212 and 214. Control processor 218 sends the PN carrier information to transmit modulator 222. A PN modulated signal is output from transmit modulator 222 to transmit power controller 208. Transmit power controller 208 sets the level of the transmission power of mobile station 230 according to commands received from control processor 218. The power control commands may be generated by control processor 218 according to commands received from the system, or may be generated by software of control processor 218, according to predetermined criteria, in response to data received from the system through digital data receivers 212 and 214. The modulated signal is then output from transmit power controller 208 to transmit power amplifier 204 where the signal is amplified and converted to an RF carrier frequency signal. The RF carrier frequency signal is then output from power amplifier 204 to duplexer 202 and transmitted from antenna 200 to the base station (not shown).

Figure 1:
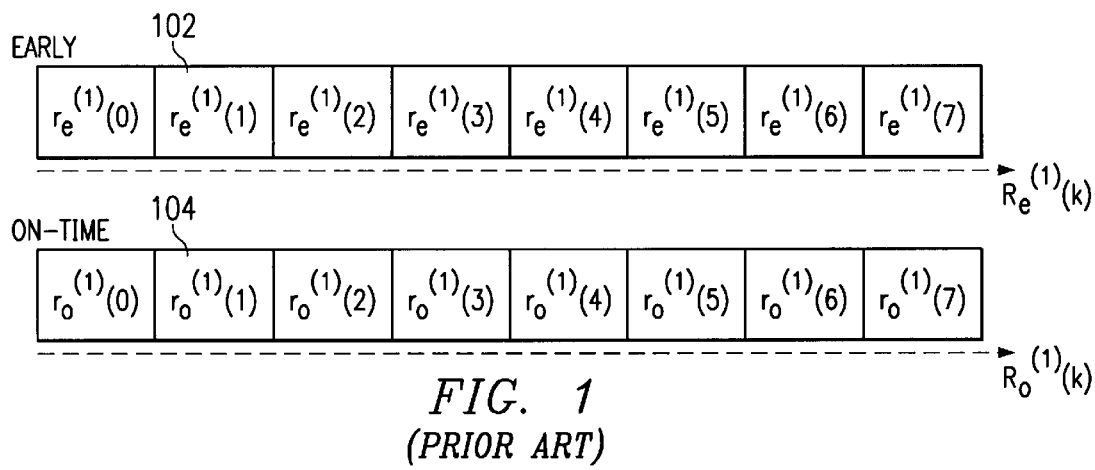
FIG. 1 illustrates a prior art method of early/on-time correlation for acquisition and multipath searching of CDMA signals.
Figure 3:
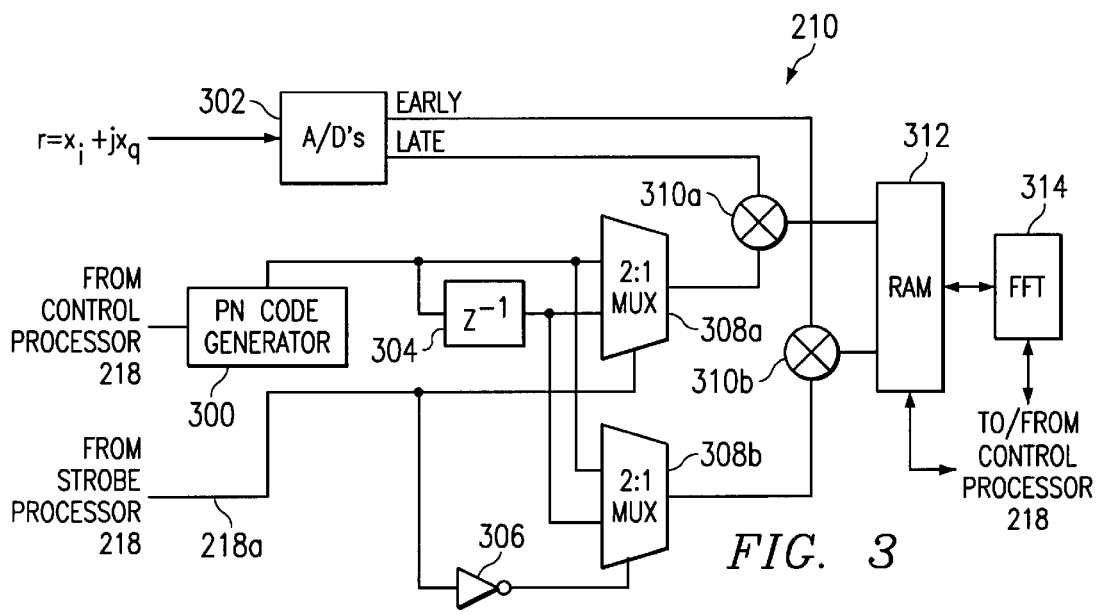
FIG. 3 is a block diagram of an embodiment of staggered-correlation searcher/receiver 210 of the CDMA receiver of FIG. 2.

Referring now to FIG. 3, therein is a functional block diagram of the staggered correlation searcher/receiver 210, configured to search two PN code phases simultaneously according to an embodiment of the invention. Staggered correlation searcher/receiver 210 includes PN code generator 300, analog to digital circuitry (A/Ds) 302, delay block ($Z^{-1}$) 304, 2:1 Multiplexers 308a and 308b, inverter 306, multipliers 310a and 310b, random access memory (RAM) 312 and fast fourier transform (FFT) block 314. Staggered correlation searcher/receiver 210 receives the analog signal that is output from analog receiver 206 at A/Ds 302. The signal output from analog receiver 206 is represented in its complex form $r = x_i + jx_q$ in FIG. 3. Staggered correlation searcher/receiver 210 also receives and inputs control and data signals to and from control processor 218. FIG. 3 shows a configuration to search for the pilot channel, which is spread by a Walsh sequence of all ones, i.e., it is effectively spread by only the PN code sequence. For searching of other channels, the Walsh code sequence used to spread the signal at the transmitter is simultaneously multiplied by the early and late signals at multiplier 506 during the correlation. The PN code sequence may have a chip rate of $1.2888 \times 10^6$ chips per second.

Figure 4:
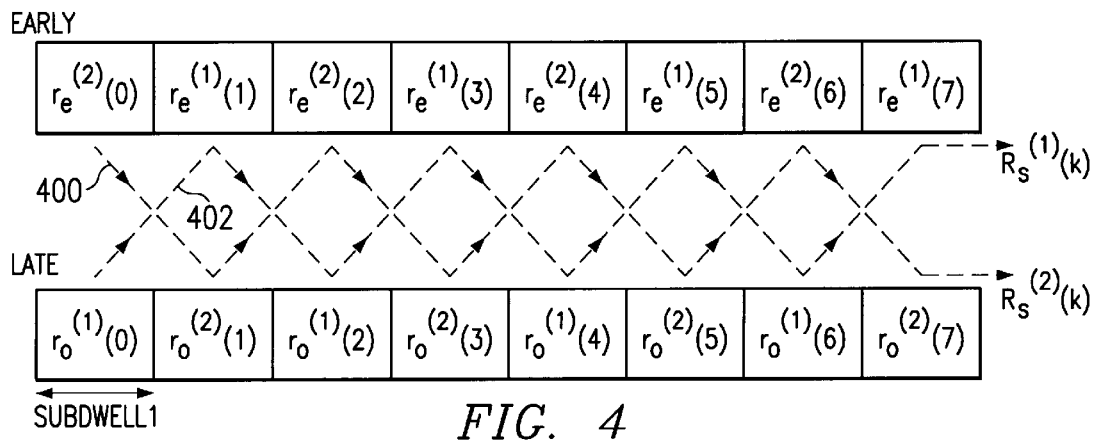
FIG. 4 illustrates multi-phase, staggered early/on-time correlation performed by staggered-correlation searcher/receiver 210 of FIG. 3.

Referring now to FIG. 4, therein is a diagram illustrating multi-phase staggered correlation performed by the staggered-correlation searcher/receiver 210 of FIG. 3. The term $r_e^{(x)}(k)$ represents the subdwell correlation result for the kth subdwell of the early signal multiplied by the PN code sequence having phase x, and the term $r_o^{(y)}(k)$ represents the kth subdwell of the late signal multiplied by the PN code sequence having phase y. Broken lines 400 and 402 indicate the sequence of subdwell correlation results on which an FFT is performed for the PN code sequence having phase 2 and 1, respectively.

The A/Ds 302 sample the input signal $r = x_i + jx_q$ to generate an early and a late signal, with the early signal being at some arbitrary search phase and the late signal delayed by ½ a chip period. A strobe signal 218a from control processor 218 alternately selects between two PN code sequences, having phase 1 and phase 2, for the outputs of 2:1 muxs 308a and 308b. The strobe signal 218a switches at the beginning of every subdwell period. This allows each subdwell of the early and late signals output from A/Ds 302 to be multiplied at multipliers 310a and 310b, respectively, by the PN code sequence having phase 1 during the time period of one subdwell, and then to be multiplied by the PN code sequence having phase 2 during the time period of the next subdwell. The results of the multiplications for each subdwell period are stored in RAM 312.

Control processor 218 sums the multiplication results to generate the time integration results that comprise the correlation results for each subdwell.

Control processor 218 then causes a first FFT to be performed on the time integration results sequence $r_e^{(x)}(k)$, $r_o^{(x)}(k+1) \ldots r_e^{(x)}(k+6)$, $r_o^{(x)}(k+7)$ (shown by broken line 400) and a second FFT to be performed on the sequence $r_e^{(x)}(k)$, $r_o^{(x)}(k+1) \ldots r_e^{(x)}(k+6)$, $r_o^{(x)}(k+7)$ (shown by broken line 402) in FFT block 314. The FFTs may be described as follows:

$$R_s^{(2)}(k) = \sum_{n=0}^{\frac{N-1}{2}} r_e^{(2)}(2n) e^{\frac{-j2\pi k 2n}{N}} + \sum_{n=0}^{\frac{N-1}{2}} r_0^{(2)}(2n+1) e^{\frac{-j2\pi k(2n+1)}{N}} \quad (5)$$

$$R_s^{(1)}(k) = \sum_{n=0}^{\frac{N-1}{2}} r_e^{(1)}(2n) e^{\frac{-j2\pi k 2n}{N}} + \sum_{n=0}^{\frac{N-1}{2}} r_0^{(1)}(2n+1) e^{\frac{-j2\pi k(2n+1)}{N}} \quad (6)$$

where $R_s^{(1)}(k)$ is the FFT result for phase 1, and $R_s^{(2)}(k)$ is the FFT result for phase 2. Control processor 218 then uses the FFT result for each phase as the detection statistic for that phase. In the preferred embodiment of the invention a total correlation length of 944 chips is chosen, and the total correlation length is broken down into 8 subdwells. The correlation length is chosen so that a detection probability similar to a baseline early/on-time correlation scheme, using a 768 chip correlation length with 12 subdwells each 64 chips wide, may be achieved. This increase in the integration length of the staggered approach mitigates an estimated mean loss of 0.9 dB in amplitude that occurs using the staggered approach (using IS-95 waveforms), compared to the early on-time scheme.

Figure 5:
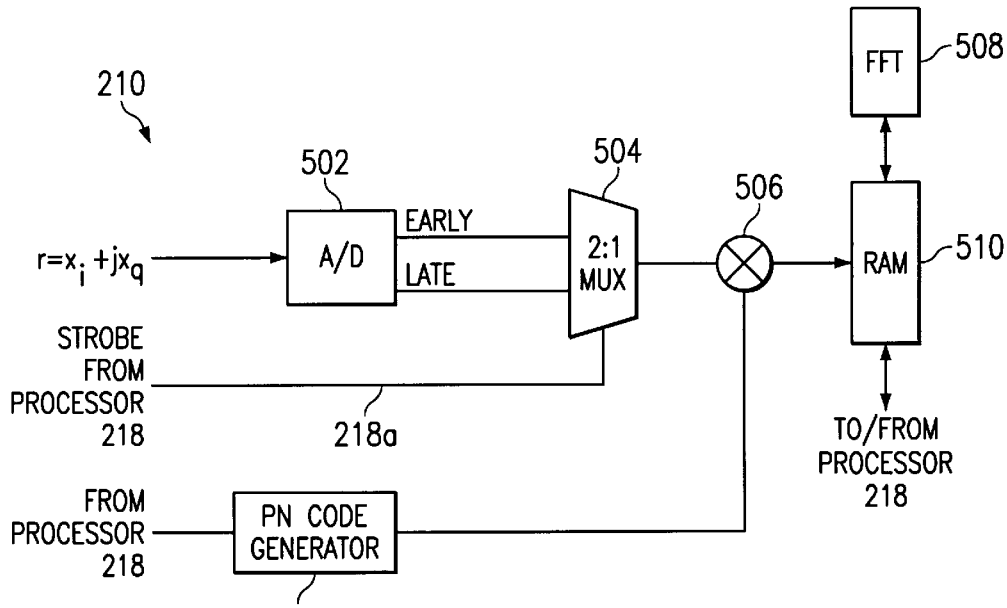
FIG. 5 is a block diagram of an alternative embodiment of staggered-correlation searcher/receiver 210 of the CDMA receiver of FIG. 2.

Referring now to FIG. 5, therein is a functional block diagram of staggered correlation searcher/receiver 210, configured to search a single PN code phase according to an alternative embodiment of the invention. In this alternative embodiment, staggered correlation searcher/receiver 210 includes PN code generator 500, analog to digital circuitry (AID) 502, 2:1 Multiplexer 504, multiplier 506, random access memory (RAM) 510 and fast fourier transform (FFT) block 508. Staggered correlation searcher/receiver 210 receives the analog signal that is output from analog receiver 206 at A/D 502. The signal output from analog receiver 206 is represented in its complex form $r = x_i + jx_q$ in FIG. 5. The staggered correlation searcher/receiver 210 also communicates control and data signals with the control processor 218. FIG. 5 shows a configuration to search for the pilot channel, which is spread by both the PN code sequence and a Walsh sequence of all ones, i.e., it is effectively spread by only the PN code sequence. For searching other channels, the Walsh code sequence used to spread the signal at the transmitter is simultaneously multiplied by the early and late signals at multiplier 506 during the correlation.

Figure 6:
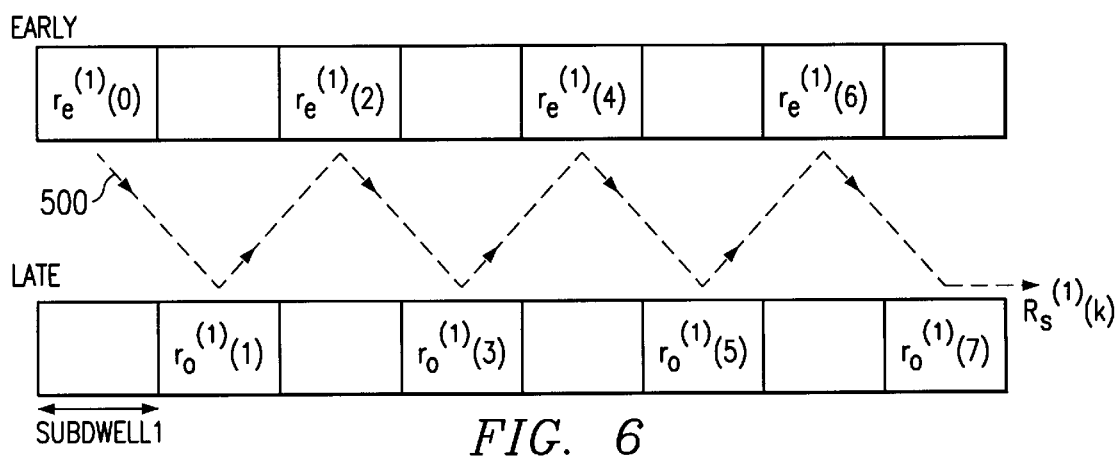
FIG. 6 illustrates single phase, staggered early/on-time correlation performed by staggered-correlation searcher/receiver 210 of FIG. 5.

Referring now to FIG. 6, therein is a diagram illustrating a single-phase staggered correlation performed by staggered-correlation searcher/receiver 210 of FIG. 5. The term $r_e^{(1)}(k)$ represents the subdwell correlation result for the kth subdwell of the early signal multiplied by the PN code sequence having phase 1, and the term $r_o^{(1)}(k)$ indicates the kth subdwell of the late signal multiplied by the PN code sequence having phase 1. Broken line 500 in FIG. 6 indicates the sequence of subdwell correlation results on which an FFT is performed for the PN code sequence having phase 1.

A/D 502 samples input signal $r = x_i + jx_q$ to generate an early and a late signal, with the early signal being at some arbitrary search phase and the late signal delayed by ½ a chip period. The strobe 218a signal from control processor 218 alternately selects between the early and late signals for the outputs of 2:1 mux 504. The strobe signal 218a switches at the beginning of every subdwell period. This allows subdwells from the early and late signals to be alternately output from A/D 502 in a staggered manner in time and to be multiplied at multiplier 506 by the PN code sequence having phase 1. The results of the multiplications for each subdwell period are stored in RAM 510. Processor 218 sums the multiplication results to generate the time integration results that comprise the correlation results for each subdwell. Control processor 218 then causes an FFT to be performed on the sequence $r_e^{(\infty)}(k)$, $r_o^{(\infty)}(k+1)$ ... $r_e^{(\infty)}(k+6)$, $r_o^{(\infty)}(k+7)$ (shown by broken line 500), in FFT block 314. The FFT may be described as follows:

$$R_s^{(1)}(k) = \sum_{n=0}^{\frac{N-1}{2}} r_e^{(1)}(2n) e^{\frac{-j2\pi k(2n+1)}{N}} + \sum_{n=0}^{\frac{N-1}{2}} r_0^{(1)}(2n+1) e^{\frac{-j2\pi k(2n+1)}{N}} \quad (7)$$

where $R_s^{(1)}(k)$ is is the FFT result for phase 1. Control processor 218 then uses the FFT result for each phase as the detection statistic for that phase.

In this alternative embodiment of the invention, the same correlation parameters may be chosen as for the multi-phase approach. As in the embodiment of FIG. 3, a total integration length of 944 chips is chosen, and the total integration length is broken down into 8 subdwells. The integration length is chosen so that a detection probability similar to a baseline early/on-time correlation scheme, using a 768 chip integration length with 12 subdwells each 64 chips wide, may be achieved. This increase in the integration length of the staggered approach mitigates the estimated mean loss of 0.9dB in amplitude that occurs using the staggered approach, compared to the early on-time scheme.

Although described in the context of particular embodiments, it should be realized that a number of modifications to these teachings may occur to one skilled in the art. By example, the correlations may be performed in a manner other than multiplying and integrating the results to generate the detection statistic.

Thus, while the invention has been particularly shown and described with respect to preferred embodiments thereof, it will be understood by those skilled in the art that changes in form and details may be made therein without departing from the scope and spirit of the invention.

What is claimed is:

1. A method for searching for a direct sequence spread spectrum (DS-SS) signal, said method comprising the steps of:
   (a) receiving a first signal, said first signal spread by at least a PN code sequence having a chip period;
   (b) generating a second signal from said first signal, said second signal being a digital signal;
   (c) generating a third signal from said first signal, said third signal being a digital signal spaced a predetermined portion of said chip period in phase from said second signal;
   (d) generating said PN code sequence at a first phase;
   (e) defining a correlation period and dividing each of said second and third signals into a first and second plurality of N subdwells, respectively, within said correlation period, wherein the N subdwells included in each of said first and second plurality of N subdwells are sequential in time, and wherein an $x^{th}$ subdwell of said first plurality of N subdwells, and an $x^{th}$ subdwell of said second plurality of N subdwells are substantially concurrent in time;
   (f) correlating said second signal with at least said PN code sequence at said first phase over a $z^{th}$ subdwell of said first plurality of N subdwells to generate a first phase correlation result for the $z^{th}$ subdwell of said first plurality of N subdwells;
   (g) correlating said third signal with at least said PN code sequence at said first phase over a $(z+1)^{th}$ subdwell of said second plurality of N subdwells to generate a first phase correlation result for the $(z+1)^{th}$ subdwell of said second plurality of subdwells;
   (h) repeating steps f and g, increasing the value of z by at least 2 for each repetition of both steps and storing the first phase correlation result for each repetition of steps f and g, until the end of said correlation period has been reached; and
   (i) generating a detection statistic for said PN code sequence at said first phase from the first phase correlation results of steps f, g, and h.

2. The method of claim 1, wherein step (i) comprises computing an FFT from the first phase correlation results of steps f, g, and h.

3. The method of claim 1, wherein step (i) comprises summing the first phase correlation results of steps f, g, and h.

4. The method of claim 1, wherein said second signal is spaced ½ of said chip period in phase from said third signal.

5. The method of claim 4, wherein said PN code sequence has a chip rate of 1.2888 million chips per second.

6. The method of claim 5, wherein said correlation period equals 944 times said chip period and the number of subdwells in each of said first and second pluralities of subdwells equals 12.

7. The method of claim 1, wherein said step of generating said PN code sequence further comprises generating said PN code sequence at a second phase, wherein step f further comprises correlating said third signal with at least said PN code sequence at said second phase during a $z^{th}$ subdwell of said second plurality of N subdwells to generate a second phase correlation result for the $z^{th}$ subdwell of said second plurality of N subdwells, wherein step g further comprises correlating said second signal with at least said PN code sequence at said second phase during a $(z+1)^{th}$ subdwell of said first plurality of subdwells to generate a second phase correlation result for the $(z+1)^{th}$ subdwell of said first plurality of subdwells, wherein step h further comprises storing the second phase correlation result for each repetition of steps f and g, and wherein step i further comprises generating a detection statistic for said PN code sequence at said second phase from the second phase correlation results of steps f, g, and h.

8. The method of claim 7, wherein step i comprises computing an FFT from the results of the correlations performed in steps f, g, and h.

9. The method of claim 7, wherein step i comprises summing the results of the correlations performed in steps f, g, and h.

10. The method of claim 7, wherein said second signal is spaced ½ of said chip period in phase from said third signal.

11. The method of claim 10, wherein said PN code sequence has a chip rate of 1.2888 million chips per second.

12. The method of claim 11, wherein said correlation period 944 times said chip period and the number of subdwells in each of said first and second pluralities of subdwells equals 12.

13. An apparatus for searching for a CDMA signal, said apparatus comprising:
   a receiver for receiving a first signal, said first signal spread by a PN code sequence having a chip period;
   a converter for converting said first signal into a second and a third signal, said second and third signals being digital signals spaced a predetermined portion of said chip period apart in phase;

a PN code generator for generating said PN code sequence at a first phase;

first control circuitry for defining a correlation period and dividing each of said second and third signals into a first and second plurality of N subdwells, respectively, within said correlation period, wherein the N subdwells included in each of said first and second plurality of N subdwells are sequential in time, and wherein the $x^{th}$ subdwell of said first plurality and the $x^{th}$ subdwell of said second plurality are substantially concurrent in time; a correlator for correlating said second signal by at least said PN code sequence at said first phase over the $z^{th}$ subdwell of said first plurality of N subdwells to generate a first phase correlation result for the $z^{th}$ subdwell of said first plurality of subdwells, and further for correlating said third signal by at least said PN code sequence at said first phase over the $(z+1)^{th}$ subdwell of said second plurality of subdwells to generate a first phase correlation result for the $(z+1)^{th}$ subdwell of said second plurality of subdwells;

second control circuitry for causing said correlator to generate said first phase correlation result for the $z^{th}$ subdwell of said first plurality of N subdwells and the $(z+1)^{th}$ subdwell of said second plurality of N subdwells, for incrementing the value of z by at least 2, and for repeating the correlation of the $z^{th}$ subdwell of said first plurality of N subdwells and the $(z+1)^{th}$ subdwell of said second plurality of N subdwells until the end of said correlation period is reached;

a memory device for storing the first phase correlation results generated for each correlation performed in said correlator; and third control circuitry for generating a detection statistic for said PN code sequence at said first phase, from the first phase correlation results stored in said memory device, when said multiplier has reached the end of said correlation period.

14. The apparatus of claim 13, wherein said third control circuitry comprises circuitry for computing an FFT from the first phase correlation results stored in said memory device to generate said detection statistic.

15. The apparatus of claim 13, wherein said third control circuitry comprises circuitry for summing the first phase correlation results stored in said memory device to generate said detection statistic.

16. The apparatus of claim 13, wherein said converter converts said first signal into a second and third signal spaced ½ of said chip period apart.

17. The apparatus of claim 16, wherein said PN code sequence has a chip rate of 1.2888 million chips per second.

18. The apparatus of claim 17, wherein said correlation period defined by said first control circuitry equals 944 times said chip period and the number of subdwells in each of said first and second pluralities of subdwells equals 12.

19. The apparatus of claim 13, wherein said PN code generator further generates said PN code sequence at a second phase, wherein said correlator further correlates said third signal with at least said PN code sequence at said second phase during the $z^{th}$ subdwell of said second plurality of N subdwells to generate a second phase correlation result for the $z^{th}$ subdwell of said second plurality of N subdwells, wherein said correlator further correlates said second signal with at least said PN code sequence at said second phase during a (z+1)th subdwell of said first plurality of N subdwells to generate a second phase correlation result for the (z+1)th subdwell of said first plurality of N subdwells, wherein said second control circuitry further causes said correlator to generate said second phase correlation result for the $z^{th}$ subdwell of said second plurality of N subdwells and the (z+1)th subdwell of said first plurality of N subdwells, to increment the value of z by at least 2, and to repeat the correlation and the increment of z until the end of said correlation period is reached, wherein said memory device further stores the second phase correlation results for each correlation performed in said correlator, and wherein said third control circuitry further generates a detection statistic for said PN code sequence at said second phase from the second phase correlation results stored in said memory device when said correlator has reached the end of said correlation period.

20. The apparatus of claim 19, wherein said third control circuitry further comprises circuitry for computing an FFT from the second phase correlation results stored in said memory device to generate said detection statistic for said PN code phase at said second phase.

21. The apparatus of claim 19, wherein said third control circuitry further sums the second phase correlation results stored in said memory device to generate said detection statistic for said PN code phase at said second phase.

22. The apparatus of claim 19, wherein said converter converts said first signal into a second and third signal spaced ½ of said chip period apart.

23. The apparatus of claim 22, wherein said chip period of said PN code sequence has a chip rate of 1.2888 million chips per second.

24. The apparatus of claim 23, wherein said correlation period defined by said first control circuitry equals 944 times said chip period and the number of subdwells in each of said first and second pluralities of subdwells equals 12.

* * * * *